(12) United States Patent
Valpola et al.

(10) Patent No.: US 11,481,585 B2
(45) Date of Patent: Oct. 25, 2022

(54) SEGMENTATION OF DATA

(71) Applicant: CANARY CAPITAL LLC, Wilmington, DE (US)

(72) Inventors: Harri Valpola, Helsinki (FI); Klaus Greff, Massagno (CH)

(73) Assignee: Canary Capital LLC, Wilmington, DE (US)

( * ) Notice: Subject to any disclaimer, the term of this patent is extended or adjusted under 35 U.S.C. 154(b) by 931 days.

(21) Appl. No.: 16/303,333

(22) PCT Filed: May 19, 2017

(86) PCT No.: PCT/FI2017/050379
§ 371 (c)(1),
(2) Date: Nov. 20, 2018

(87) PCT Pub. No.: WO2017/198909
PCT Pub. Date: Nov. 23, 2017

(65) Prior Publication Data
US 2019/0220691 A1  Jul. 18, 2019

(30) Foreign Application Priority Data

May 20, 2016  (FI) ..................... 20160136

(51) Int. Cl.
*G06K 9/62* (2022.01)
*G06N 3/02* (2006.01)
*G06N 3/08* (2006.01)

(52) U.S. Cl.
CPC .......... *G06K 9/627* (2013.01); *G06K 9/6256* (2013.01); *G06N 3/02* (2013.01); *G06N 3/08* (2013.01)

(58) Field of Classification Search
None
See application file for complete search history.

(56) References Cited

U.S. PATENT DOCUMENTS

2014/0156569 A1  6/2014  Harik
2016/0117574 A1*  4/2016  Mei ................. G06K 9/627
                                                382/159

FOREIGN PATENT DOCUMENTS

WO        03/098522 A1    11/2003

OTHER PUBLICATIONS

Li Deng et al: "Deep Learning: Methods and Applications", Foundations and Trends in Signal Processing, vol. 7, No. 3-4, Jun. 30, 2014 (Jun. 30, 2014), pp. 197-387, XP055365440, ISSN: 1932-8346, DOI: 10.1561/2000000039.

(Continued)

*Primary Examiner* — Leon Flores
(74) *Attorney, Agent, or Firm* — Young Basile Hanlon & MacFarlane, P.C.

(57) ABSTRACT

Disclosed is a computer-implemented method for segmenting input data. In the method a plurality of tags is generated; the input data is masked with the plurality of tags; a plurality of output reconstructions is generated by inputting the plurality of masked input data to one of the following: a denoising neural network, a variational autoencoder; a plurality of values representing distances of each plurality of output reconstructions to the input data are determined; a plurality of updated versions of input data is generated by applying at least one of the determined values representing distances of each plurality of output reconstructions to the input data; and updated output reconstructions are generated by inputting the plurality of updated versions of input data to one of the networks. Also disclosed is a method for training the network and a processing unit.

21 Claims, 6 Drawing Sheets

(56) References Cited

OTHER PUBLICATIONS

Kezhen Teng et al: "Mask Assisted Object Coding with Deep Learning for Object Retrieval in Surveillance Videos", Multimedia, ACM, 2 Penn Plaza, Suite 701 New York NY 10121-0701 USA, Nov. 3, 2014 (Nov. 3, 2014), pp. 1109-1112, XP058058744, ISBN: 978-1-4503-3063-3, DOI: 10.1145/2647868.2654981.
Tagger: Deep Unsupervised Perceptual Grouping, Submitted to 29th Conference on Neural Information Processing Systems (NIPS 2016). Do not distribute.
International Search Report, dated Sep. 18, 2017, from corresponding PCT/FI2017/050379 application.

\* cited by examiner

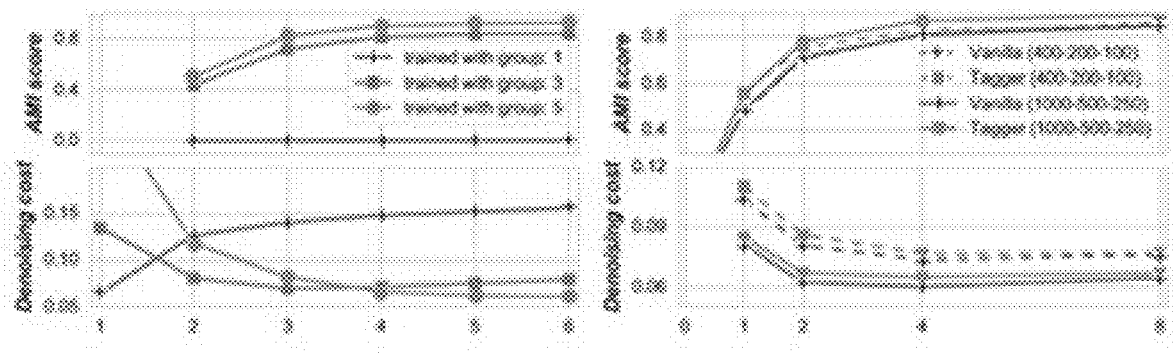
FIGURE 7
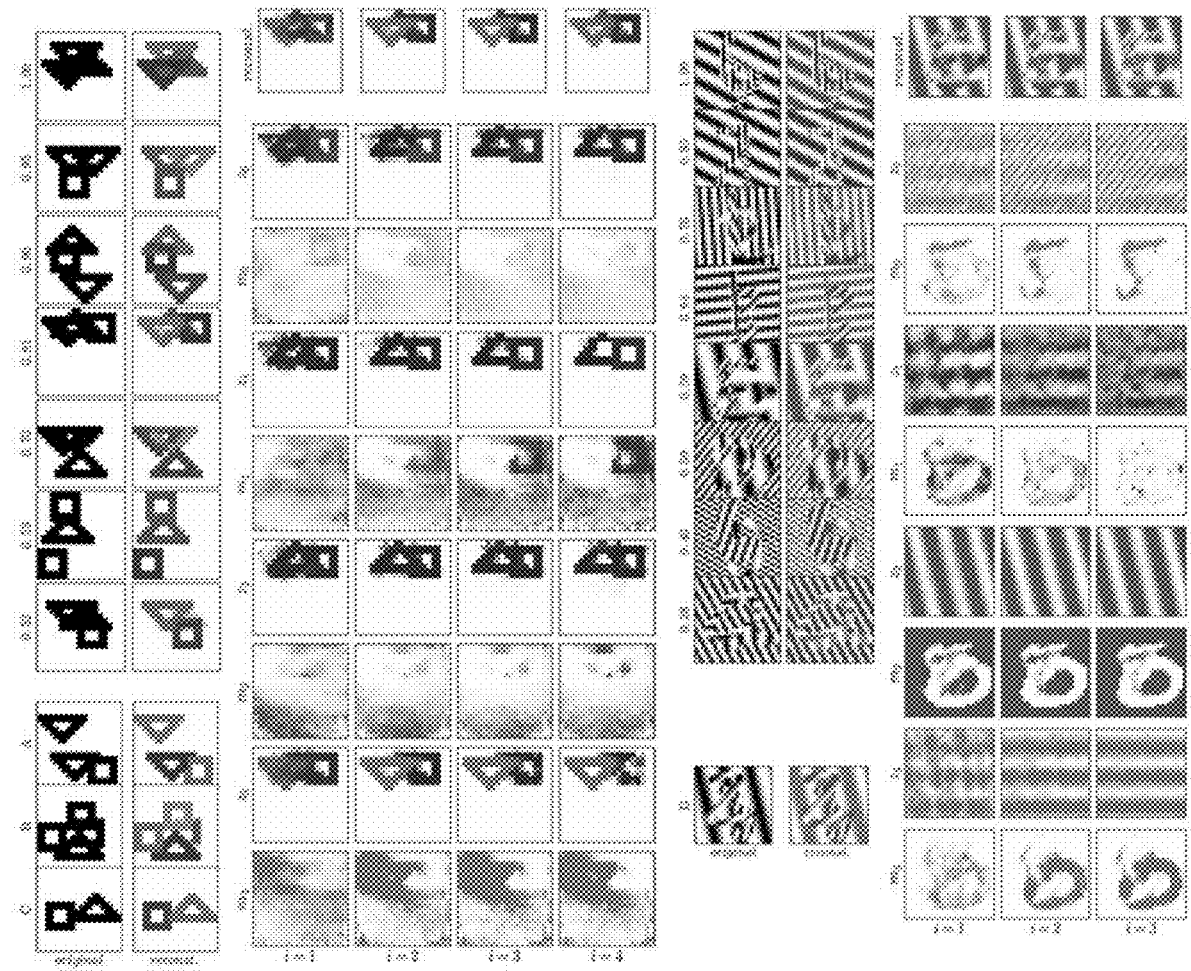
FIGURE 8A  FIGURE 8B

SEGMENTATION OF DATA

TECHNICAL FIELD

The invention concerns in general the technical field of neural networks. More particularly, the invention concerns segmentation of data with neural network.

BACKGROUND

Machine learning methods are utilized widely in modern technology, for example in machine vision, pattern recognition, robotics, control systems and automation. In such applications machine learning is used in computer-implemented parts of a system or device for processing input data. As a matter of fact the area is increasingly becoming more important because different autonomously operating systems and devices are developed.

The existing solutions for unsupervised learning in deep neural networks are slow and have challenges especially in learning abstract features. Moreover, such solutions are not well compatible with supervised learning.

One specific solution which alleviates the above mentioned problems is so called "ladder" neural network structure. In the "ladder" type neural networks, as in an ordinary autoencoders, the neural network is trained iteratively by giving it input data vectors (such as images), and minimizing a cost function, etc. However, in practice such ladder networks and autoencoders may fail to efficiently learn to represent the data in real world applications, such as images or videos with complex scenes and large numbers of objects. This is because there is no sufficient mechanism to direct different parts of the network to "concentrate" to represent different parts of the data, for example different objects in an image when the network is trained to be used for an image segmentation task.

As said the segmentation task is challenging to implement due to its nature as often being dynamic, ambiguous and task dependent. Thus, there is need to develop mechanisms by means of which it is at least possible to improve segmentation of input data and at least partly to mitigate the challenges in unsupervised learning in neural networks, especially in a context of digital images and any similar digital data.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method for segmenting data and a method training a neural network as well as a processing unit for implementing the same accordingly.

The objectives of the invention are reached by solutions as defined by the claims.

According to a first aspect, a computer-implemented method for segmenting input data is provided, the method comprising: generating a plurality of tags for at least one data element in the input data; masking the input data with the plurality of tags for generating a plurality of masked input data; generating a plurality of output reconstructions by inputting the plurality of masked input data to one of the following: a denoising neural network, a variational autoencoder; determining a plurality of values representing distances of each plurality of output reconstructions generated by the one of the following: denoising neural network, the variational autoencoder to the input data; generating a plurality of updated versions of input data by applying at least one of the determined values representing distances of each plurality of output reconstructions to the input data; and generating updated output reconstructions by inputting the plurality of updated versions of input data to one of the following: the denoising neural network, the variational autoencoder.

The generation of a plurality of updated versions of input data may comprise: determining a minimum distance among the values representing the distances of the plurality of output reconstructions to input data and the tag that generated the minimum distance; updating the generated tags by replacing the tags with the tag that generated the minimum distance; and obtaining data elements of the input data corresponding to original tags from input data and other data elements from the output reconstruction data generated with the tag that generated the minimum distance for generating new input data.

Moreover, the method may further comprise: obtaining the values representing distances of each plurality of output reconstructions to the input data and providing them to the one of the following: denoising neural network, variational autoencoder for generating updated tags.

The method may further comprise: obtaining the values representing distances of each plurality of output reconstructions to the input data and providing them to the one of the following: denoising neural network, variational autoencoder for generating updated tags; determining a minimum distance among the values representing the distances of the plurality of output reconstructions to input data and the tag that generated the minimum distance; and obtaining data elements of the input data corresponding to original tags from input data and other data elements from the output reconstruction data generated with the tag that generated the minimum distance for generating new input data.

According to a second aspect, a method for training a denoising neural network or a variational autoencoder is provided, the method comprising: receiving training data as input to the denoising neural network or the variational autoencoder; evaluating the denoising neural network or the variational autoencoder with the method as described above; receiving an output from the evaluation; determining a cost function from the output of the evaluation; iteratively minimizing the cost function by adjusting at least one parameter of the denoising neural network or the variational autoencoder.

The received input data may be one of the following: digital images, video frames.

The denoising neural network or the variational autoencoder may be a network, wherein at least one of the network layers is connected forward in time so that iteration is done in time with the input data changing.

According to a third aspect, a processing unit is provided, the processing unit comprising: at least one processor; at least one memory including a computer program code; wherein the at least one memory and the computer program code configured to, with the at least one processor, cause the processing unit to perform any of the methods described above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 7 illustrates schematically some aspects relating to training.

FIGS. 8A and 8B illustrate schematically some further aspects relating to training.

DESCRIPTION OF THE EXEMPLIFYING EMBODIMENTS

Figure 1:
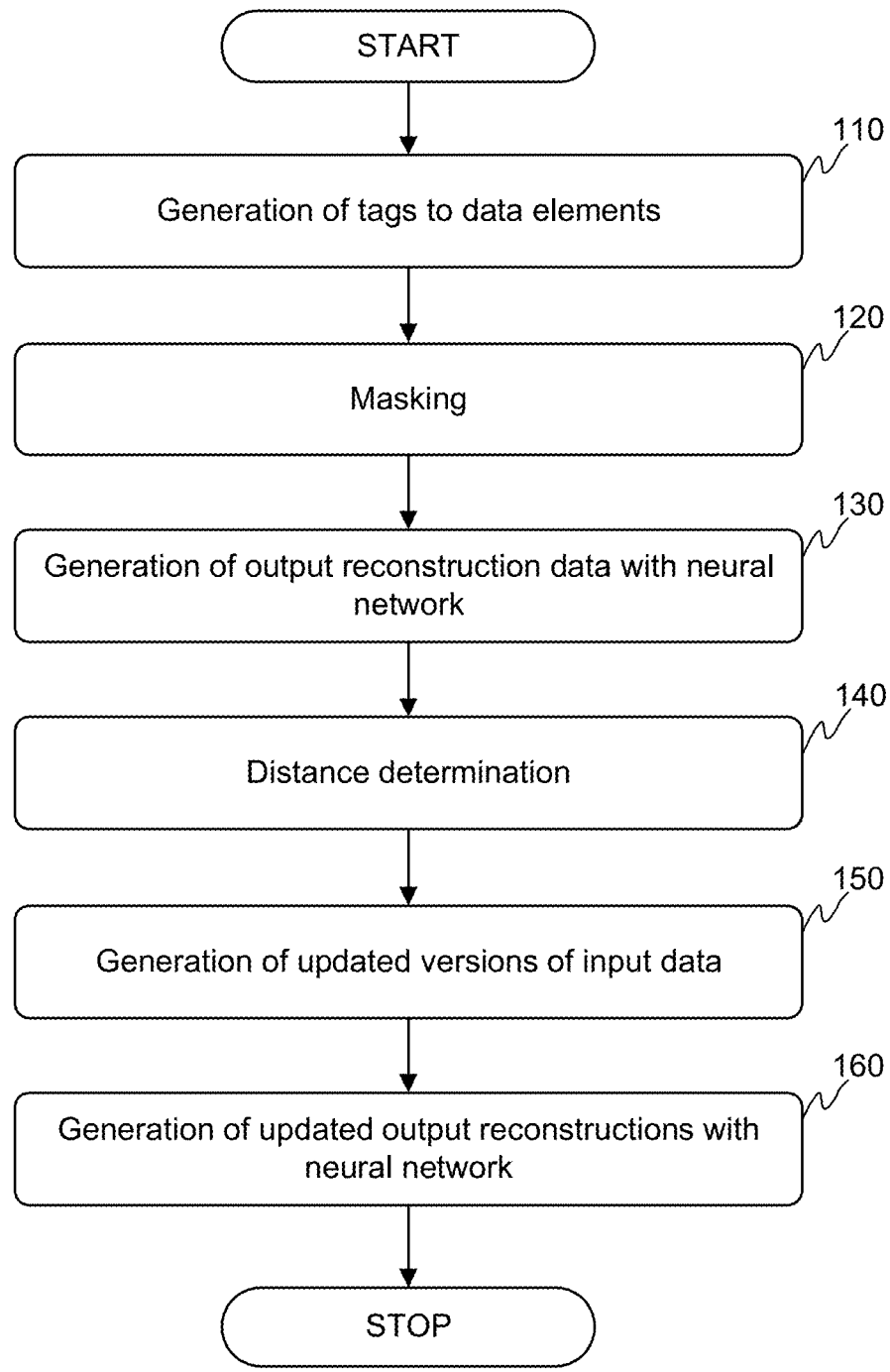
FIG. 1 illustrates schematically a computer-implemented method according to an embodiment of the invention.

The specific examples provided in the description given below should not be construed as limiting the scope and/or the applicability of the appended claims. Lists and groups of examples provided in the description given below are not exhaustive unless otherwise explicitly stated.

The present invention improves, at least partly, the training of a neural network by introducing a mechanism which guides parts of the network to learn to represent different parts of the input data, for example to separate objects in an image when the network is trained for an image segmentation task. In the training phase, neurons of the neural network are "tagged" with information about which parts of the input data they act on. One important aspect of the invention is that tags for each neuron are appended to the input data of the neural network, and produced as a part of the output of the network. The tags may be initially valued in any arbitrary manner. When the neural network is trained, the tags are automatically learned along the rest of the neural network, while the tagging mechanism guides the network to learn more efficiently. According to some embodiment of the invention a competition may be introduced for the tags, so that when the network is trained the neurons concentrate on different parts of the input data.

In the following at least some aspects of the invention are described as a computer-implemented method by referring to FIG. 1 that schematically depicts method steps according to an embodiment of the invention. In the beginning input data is provided to the engine as depicted in the FIG. 1. The input data is given in a digital form and it represents a predetermined target. For example, the input data may e.g. be a digital image composed of a predetermined amount of pixels having a discrete value in order to represent an original object(s) in a digital form. In some application the digital image may consists of a plurality of image layers each comprising a part of image content of the full image consisting of the overlaid layers. Furthermore, the input data may e.g. be a digital video consisting of consecutive image frames disclosing moving visual images in the form of encoded digital data. Naturally, the video may be a stored digital video or a video stream of a real-time event.

In the first phase so called tags are generated 110 and assigned to one or more data elements forming the input data. The data element may e.g. be a pixel or a group of pixels of the original image. As already mentioned the tags may be valued in any arbitrary manner and they function as masks for the data elements of the input data. The number of tags may be arbitrary and depend on an application area, but at least a plurality of tags is used wherein the tags differ from each other. The difference in tags at least refers to that the different tags have different values compared to each other in at least one corresponding data elements in the tags.

Next, the input data is masked 120 with the tags which masking generates N versions of the input data called as masked input data. The masking refers to a mathematical operation in which two mathematical representations, such as matrices, are combined with a predetermined mathematical operation, such as with multiplication, together.

In step 130 at least the pieces of the masked input data are input to a neural network for generating a number of output reconstructions, i.e. approximations of the original input data which output reconstructions the neural network is configured to generate after the original input data has been processed in some manner, such as corrupting it by adding noise, from the pieces of masked input data. The neural network is a denoising type of network or autoencoder. Denoising neural networks, such as denoising autoencoders, are well known unsupervised machine learning methods in the literature, and typically include taking as input a corrupted version of original input data, and producing as output (at least an attempt at) a reconstruction of the original uncorrupted input data. The denoising neural network is configured to generate a number of output reconstructions from the pieces of masked input data so that the number of output reconstructions corresponds to the number of pieces of the masked input data, which are input to the denoising neural network together with the original input data. In other words, the neural network generates, by minimizing the cost function defined by the structure of the neural network, output reconstructions that are returned to a processing unit configured to perform the method as described. The present invention may also be implemented with a variational encoder instead of denoising neural network.

Next, the processing unit is configured to determine 140 for each data element in the input data a value representing a distance of each data element in the original input data to each data element in each output reconstruction generated by the neural network.

In response to the determination of the value representing the distance the processing unit is configured to apply at least one of the determined distance value for generating a plurality of updated versions of the input data 150. According to the present invention the application of the distance information may be performed in a number of ways, which will be discussed later herein.

In step 160 the updated versions of the input data are input to the neural network which, through minimizing the cost function defined by the structure of the neural network, generates updated output reconstructions.

The method as described above has an advantage that generating the pieces of the masked input data, or "segmenting" the input data, allows the network to work as if it was being applied to simpler input data, allowing for the use of unsupervised and semisupervised methods for the configuration of the neural network, which methods usually do not perform well with complex real-world data. Unsupervised and semisupervised machine learning methods however have the advantage that they do not require large amounts of labelled training data, which can be costly to collect and maintain. The method as described above has an advantage also in that the resulting tags represent a "segmentation" of the input data which is in itself a very useful result. For example, the method is applicable to dividing an input image into separate pieces of masked input data which can be used to detect separate objects in the original input image (this is described in an example later.)

Figure 2A:
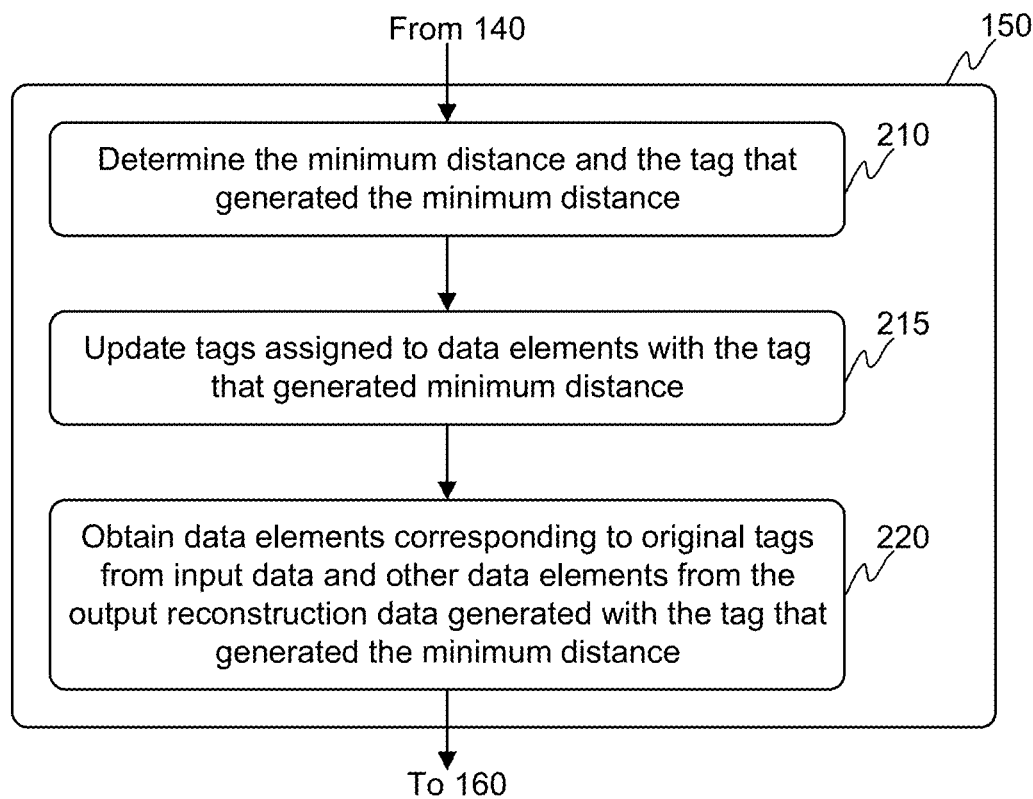
FIGS. 2A-2C illustrate schematically some examples to implement a step in the method.

In FIGS. 2 A-C it is illustrated schematically at least some alternative ways to implement the above described phase 150 in which it is generated the updated versions of the masked input data. According to first embodiment of the invention the step 150 may be implemented so that the processing unit is configured to determine, as depicted in step 210 in FIG. 2A, the minimum distance from all the distances generated in step 140 and in response to finding the minimum distance to determine which tag was originally used in the masking phase 120 that generated the minimum distance. In response to the determination of the tag in question the processing unit is configured to update all tags 215 assigned to the data elements of the input data and used for masking with the tag which generated the minimum distance so that the updated tags are used in the next iteration. Further, the processing unit is configured to obtain 220 the data elements for the updated version of the input data for each tag. The elements are obtained by masking the original input data by the tag in question (in effect selecting the data elements that are tagged with the tag in question), and using for the remainder of the data elements the data elements from the output reconstruction generated with the tag. For sake of clarity the input data corresponding to the original tags data refers to data elements tagged with the tag in question. The steps 215 and 220 in FIG. 2A may be implemented consecutively or at least partly in parallel.

Figure 2B:
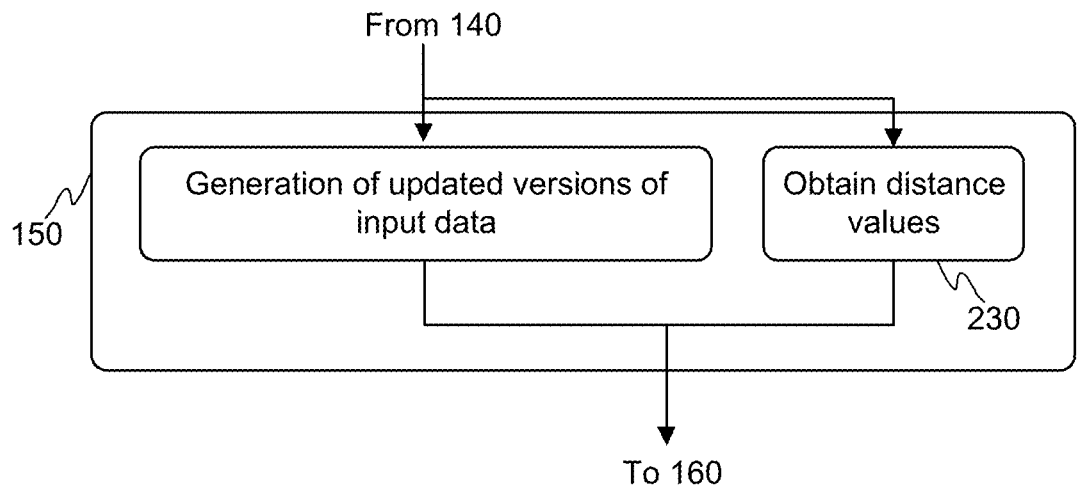

FIG. 2B illustrates schematically an alternative implementation of step 150. The step is otherwise the same as discussed earlier but in addition to the generation of the updated versions of the masked input data the distance values are also obtained 230 from step 140 and carried to the neural network in step 160. In this kind of implementation the neural network is configured to generate, in addition to the output reconstructions, updated tags, and wherein updated tags are used for masking the input data in the next iteration of the method as shown in FIG. 1.

Figure 2C:
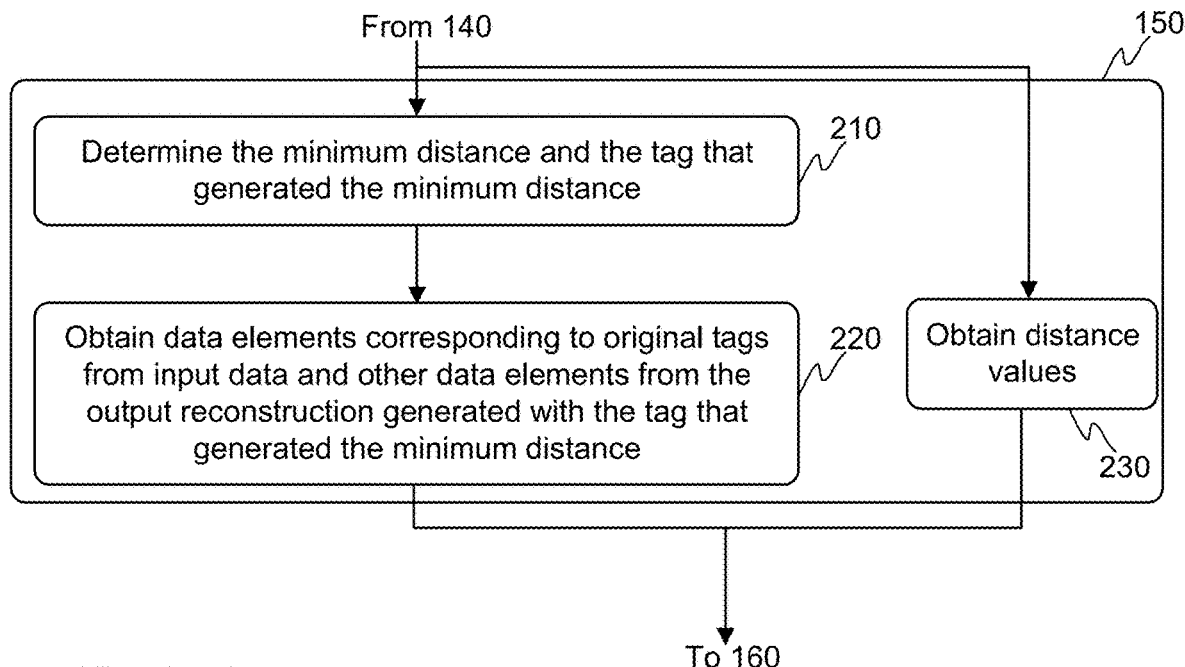

FIG. 2C illustrates schematically a still further alternative implementation of step 150. In this case the neural network is also such that it is capable of updating tags when the distance values are given there as inputs, as in the implementation of FIG. 2B. This enables implementing the step 150 as depicted in FIG. 2C so that the distance values are obtained 230 from the previous step and carried to the neural network for step 160. Otherwise, the step 150 in the implementation of FIG. 2C comprises a sub-step in which the processing unit is configured to determine 210 the minimum distance from all the distances generated in step 140 and in response to finding the minimum distance to determine which tag was originally used in the masking phase 120 that generated the minimum distance. In response to the determination of the tag the processing unit is configured to obtain 220 data elements of the input data corresponding to original tags data and the other data elements from the output reconstruction generated with the tag that generated the minimum distance.

An example of an implementation of the described method are automation tasks which rely on machine vision, e.g. robotic picking and sorting, or automated or "self driving" vehicles such as cars, trucks, planes, boats or drones. In a self-driving car, a camera system attached to the car can be used to image the surroundings of the car by capturing images or video. In order to process the captured images or video to make control decisions, the described method can be used to recognize objects in the images or video frames, for example detecting other vehicles, pedestrians, obstacles etc. The segmentation result produced by the described method (i.e. the tags or masks) can be used in such an application to determine the location of detected objects in the images and hence in relation to the car, when combined with information about the camera position relative to the vehicle, and/or other sensors in the car such as distance sensors, 3d cameras and so on. The described method is especially suitable for such real-time image processing tasks because such images (often consecutive video frames) typically include the same objects which the described method attempts to tell apart by the segmentation. Learning to segment out and classify a moving car from consecutive images is fundamentally the same problem as presented in the example with the three randomly chosen shapes (triangle up, triangle down, or square) composed together at random positions with possible overlap, and said example describes the way the described method would be applied to a corresponding real world machine vision task.

The method can be used to segment the input images (or other data) into objects (for example to indicate their position as described above), for image recognition or classification task in a later separate method, or the classification task can be performed integrated in the method as described by way of the examples above. In a robotic picking or sorting application, the location and classification of objects is similarly achieved. In self-driving vehicles, automated picking or sorting, and image classification and object recognition applications in general, the described method allows for unsupervised and semi-supervised machine learning methods to be used, which is beneficial because then the application can e.g. be made to adjust to the task and environment while in operation, learning from gathered data unsupervised, instead of requiring labelled data to be first gathered, machine learning component re-trained, and only then updated to the machine in the application.

Figure 3A:
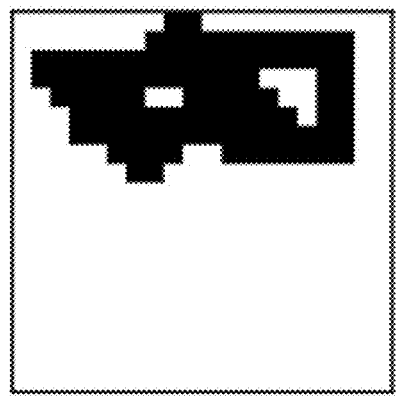
FIGS. 3a-3D illustrate schematically non-limiting examples of an input and output of the method according to an embodiment of the invention.

Next at least some aspects of the present invention are described with reference to above given discussion in a non-limiting application area in which input data is a plurality of digital images. Specifically, the context of the present example is image segmentation and recognition application. In the example, the invention is used in a task where digital images are to be automatically "segmented", i.e. multiple objects contained in the image are separated, for example for dividing the image into images of separate objects for using the images of the separate objects later in an image recognition application to recognize the objects contained in the image. The digital images may e.g. be images taken by a digital camera or a digital video camera of arbitrary resolution and preprocessing depending on the application. For simplicity and ease of illustration for introducing at least some aspects of the invention, in this example 20×20 pixel black and white images containing three objects, each one of an up-pointing triangle, down-pointing triangle or a rectangle, is used. FIG. 3A schematically illustrates an example of the image input to the processing unit performing at least some of the method steps of the present invention. Preprocessing of the input images, if any, is already assumed having been applied. Each such image then constitutes an input data vector of 400 data elements (numerical values, 1 color value×20×20 pixels) for the purpose of describing at least some aspects of an embodiment.

An iterative network to denoise inputs is trained using the images. For training the denoising network an ADAM deep learning training system may be used, for example.

In the following some aspects of the denoising encoder network utilized in the example are described. The final output of the denoising network itself is an approximation $q(x)$ of the true probability $p(x|\tilde{x})$ which it refined over iterations indexed by i, i.e. the network generates an approximation of the original uncorrupted input data. In this example, the negative log likelihood $$C_d(x) = \Sigma_j - \log q(x_j)$$

where the summation is over elements j of the input, is used as the cost function for training the network.

Internally, the denoising network according to an embodiment maintains a predetermined number of "groups" G versions of its internal representations of the input images which are indexed by g. $z_g$ is the expected value of the input and $m_g$ are the group assignment probabilities. Each has the same dimensionality as the input and they are updated over iterations. Each group g makes its own prediction about the original input based on $z_g$. In the binary case the prediction is simply $Q(X_j|g) = z_{g,j}$, and in the continuous case we take $z_{g,j}$ to represent the mean of a Gaussian distribution. Other estimates, like the variance of the Gaussian distribution, may also be added.

The final prediction of the network may be defined to be $$q(x_j) = \Sigma_g m_{g,j} q(x_j|g)$$

The group assignment probabilities are forced to be non-negative and sum up to one over $g: m_{g,j} > 0$ and $\Sigma_g m_{g,j} = 1$. The denoising task encourages the network to iteratively group its inputs into coherent groups that may be modeled efficiently. The trained network may be useful for a real-world denoising application, but typically the idea is to encourage the network to learn interesting internal representations. So it is not $q(x)$ but $m_s$, $z_s$ and the internal representations of the parametric mapping that is typically cared for.

Next the application of the network in the context of the digital images is now described. First, tags corresponding to a predetermined number of groups are generated for the data elements, wherein the data element refers to a pixel in the input image (cf. step 110 in FIG. 1). The number of groups G to be used may depend on the application. In the non-limiting example with digital images as mentioned G equals to 3 and the tags are implemented as 3 data vectors of 400 elements each, or in other words as mask images m1, m2 and m3, so that the value of the first element of $m_g$ represents whether the corresponding input data element belongs to group g. The determination if the input data element belongs to group g may e.g. be implemented so that if the data element has a value 0, it may be interpreted to mean that the input data element does not belong in the group, whereas if the data element has a value 1, it may be interpreted to mean that it does belong in the group. In this example the masks $m_g$ are visualized as images with the same dimensions as the input data, with element values visualized as grayscale pixels where 0 is shown as white and 1 is shown as black.

In this non-limiting example the masks may be initialized with random values.

The input data may be corrupted before inputting it to the neural network, wherein this may be considered as a pre-processing step. In this example, the input data may be corrupted by adding Gaussian noise of variance 1 to the input data vector.

Next, the tags are used to mask the input data vector to obtain 3 new vectors z1, z2 and z3 (cf. step 120 in FIG. 1). The network may be trained to produce reconstructed versions of each $z_g$. In this example the neural network is a denoising autoencoder used for generating denoised reconstructions of input data in image recognition (cf. step 130 in FIG. 1).

Then, for each element in each $z_g$, a distance to the corresponding original input data element (i.e. a pixel in the input image) may be determined (cf. step 140 in FIG. 1). The group g where the element is the closest to the original input data element is considered as the group where that element belongs in. In this example, this corresponds to g denoting which of the G objects the pixel in the input image is in. The element values of $m_g$ may be binary, in which case they may be thought of simple group assignments, or real numbers, in which case they may be thought as the probability that the element belongs to the group.

Masks $m_g$ are updated by increasing the value of the element in the vector mg and decreasing the value of the element in the other masks. Put another way, the tags are updated so that each element is tagged to belong to the group that corresponds to the shortest distance to the original input. In this example, the distance is calculated by:

$$(\text{element value}) - (\text{original input element value}).$$

Now, updated versions of input data $z_i$ may be generated by obtaining data elements corresponding to original tags from input data (cf. step 150 in FIG. 1) and other data elements from the output reconstruction data may be generated.

Finally, updated versions of output reconstructions may be generated by the network (cf. step 160 in FIG. 1).

Figure 3B:
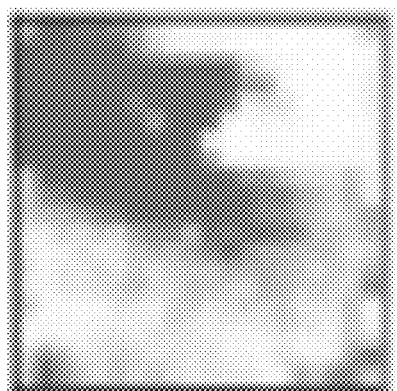
Figure 3C:
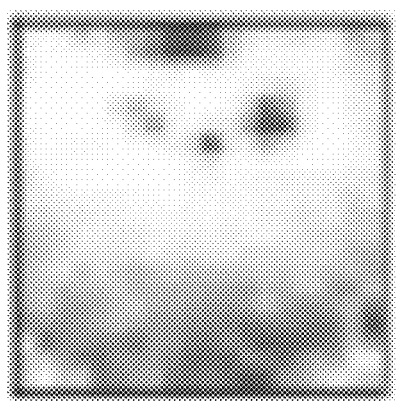
Figure 3D:

The process as described may be iterated with the available training images until some predetermined end condition. The end condition may e.g. be a number of iterations, or the iteration is continued until a preset threshold of cost function is reached, or until some evaluation criteria, for example the distance of the output to the input with a set of test data, is reached. As a result of the method described, the resulting iteratively updated tags, i.e. the mask images, may be generated and a segmentation of the original input image may be formed. In this example, each mask image may comprise pixels of a detected object set to high values and other pixels set to low values. The mask images then determine where in the image the objects are e.g. for locating the objects and extracting them from the image for image recognition purposes. FIGS. 3B, 3C and 3D illustrate schematically an example of the segmentation process according to the present invention, when the input is the image of FIG. 3A. In other words, the outcome of the segmentation may be an image illustrating a triangle down (FIG. 3B) segmented from image 3A, an image illustrating a triangle up (FIG. 3C) and an image illustrating a square (FIG. 3D).

In the invention, when using input data that forms a sequence of consecutive parts, such as digital video frames, layers of the network may be connected forward in time, so that iteration happens in time with the input data changing (in the case of digital video frames, or consecutive digital images, for example, a first frame is first used as input data as described above, then a next frame is selected, and so on). I.e. the network is structured as what is known as a recurrent network, where parameters of at least one layer are shared, or in another words at least one layer are connected) when iterating over input data pieces.

Figure 4:
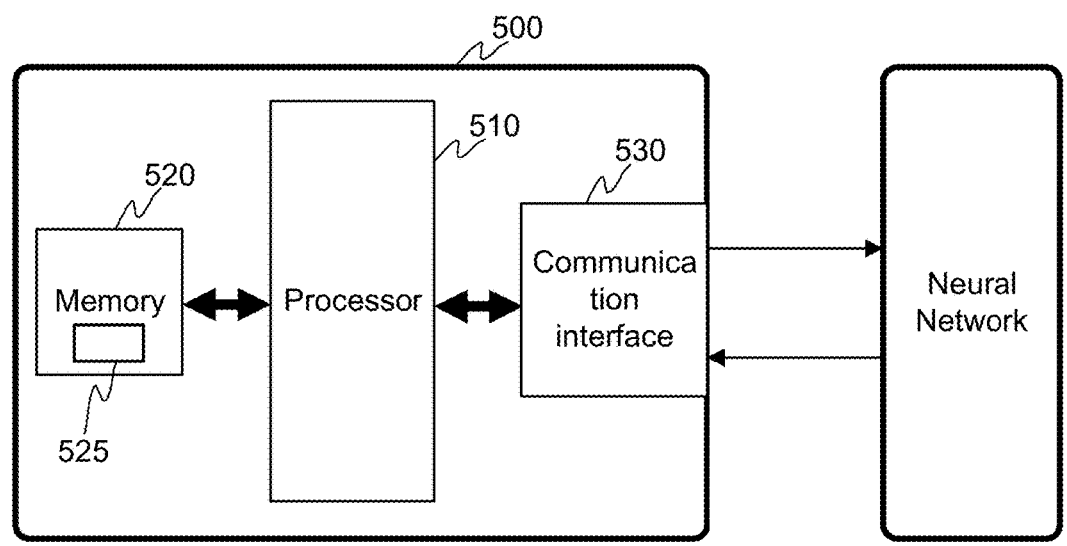
FIG. 4 illustrates schematically an example of a processing unit according to an embodiment of the invention.

The processing unit may refer to a computer system, a computer, a circuit or a processor into which the processing of data as described is implemented. FIG. 4 illustrates an example of a processing unit 500 according to an embodiment of the invention. The processing unit may comprise one or more processors 510, one or more memories 520 and one or more communication interfaces 530 which entities may be communicatively coupled to each other with e.g. a data bus. The communication interface 530 comprises necessary hardware and software for providing an interface for external entities for transmitting of data to and from the processing unit. The one or more processors may be configured to control the operation causing the processing unit to perform the operation as described and outputting the segmented data as described. Moreover, the processing unit may comprise a neural network that is executed in one or more processors belonging to the processing unit, or alternatively the processing unit inputs information to an external neural network and receives output from there as described. The input and output of information to and from the neural network may be performed through the communication network.

In the following further aspects of the present invention are disclosed by describing the invention in more detail:

Tagger: Deep Unsupervised Perceptual Grouping

Abstract 1

We present a framework for efficient perceptual inference that explicitly reasons about segmentation of its inputs and features. Instead of being trained for any specific segmentation our framework learn the grouping process in an unsupervised manner, or alongside any supervised task. By enriching the representations of a neural network we enable it to group the representations of different objects in an iterative manner. By letting the system amortize the iterative inference of the groupings, we achieve very fast convergence. In contrast to other recently proposed methods to deal with multi-object scenes our system does not assume the inputs to be images and can therefore directly deal with other modalities. In multi-digit classification of very cluttered images that require texture segmentation, our method offers improved classification performance over convolutional networks despite being fully connected. Furthermore we observe that our system greatly improves on the semi-supervised result of a baseline Ladder model on our dataset, indicating that segmentation can also improve the sample-efficiency.

1 INTRODUCTION

Figure 5:
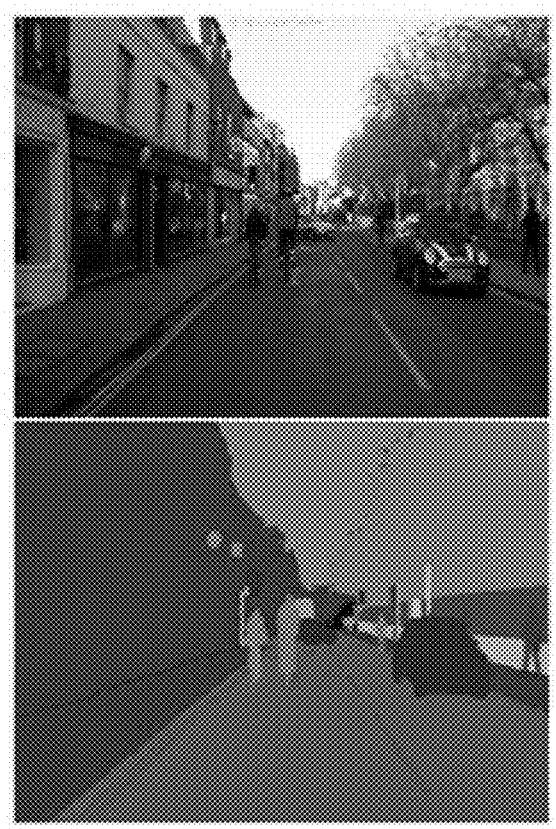
FIG. 5 illustrates schematically an example of segmentation.

Humans naturally perceive the world as structured into different objects, their properties and relation to each other. This perceptual grouping happens effortlessly and includes a segmentation of the visual input like for example in FIG. 5.

But it applies analogously also to the other modalities, for example in solving the cocktail party problem (audio) or when separating the sensation of a grasped object from the sensation of fingers touching each other (tactile). Even more abstract features like object class, color, position, and velocity are naturally grouped together with the inputs to form coherent objects. This rich structure is crucial for many real world tasks such as driving a car, where awareness of different objects and their features is required. However the "correct" grouping is often dynamic, ambiguous and task dependent. For example, if driving along the road in FIG. 5 it is useful to group all the buildings to the left (segmentation in red) together. To find a specific house, however, it is important to separate the buildings, and for entering one they need to be subdivided even further. So instead of treating segmentation as a separate task, we provide a mechanism for grouping as a tool for our system. That way it can learn how to best group its inputs depending on the task.

To that end we introduce a framework for learning efficient iterative inference for perceptual grouping which we call iTerative Amortized Grouping (TAG). It entails a mechanism for iteratively grouping the inputs and internal representations into several different parts. We make no assumptions about the structure of this segmentation and instead train the model end-to-end to discover which are the relevant objects and how to do the splitting, in a completely unsupervised manner. This is achieved by focusing directly on amortizing the posterior inference of the objects and the grouping using an auxiliary denoising task. Because the TAG framework doesn't make any assumptions about the structure of the data, it is completely amodal and applicable to any kind of data.

Another class of recently popular mechanisms to deal with complex structured inputs is attention. These methods simplify the problem of perception by learning to restrict processing to a part of the input. In contrast, TAG just structures the input without directing the focus or discarding irrelevant information. These two systems are not mutually exclusive and could even complement each other: the group structure can help in deciding what exactly to focus on, which in turn may help simplify the task at hand.

We apply our framework to two artificial datasets: a simple binary one with multiple shapes, and one with two overlapping textured MNIST digits on a textured background. We find that our method learns intuitively appealing groupings that support denoising performance as well as classification. Our results for the 2-digit classification are significantly better than a strong ConvNet baseline despite using a fully connected network. The improvements for semi-supervised learning with 1.000 labels are even bigger, suggesting that grouping can help learning and thus increase sample efficiency.

2 ITERATIVE AMORTIZED GROUPING (TAG)

Grouping. Our goal is to enable neural networks to split inputs or internal representations into groups that can be processed separately. We hypothesize that processing everything in one clump is often difficult due to unwanted interference, but separate processing of groups allows the network to use invariant features without risking ambiguities. We thus define a group to be a collection of inputs and internal representations that are processed together (largely) independently of the other groups. We split processing of the input into G different groups but let the network learn how to best use this ability in a given problem like classification. We don't assume anything about the correspondence between objects and groups. If the network can process several objects in one group without unwanted interference then the network is free to do so. We keep the groups symmetric in the sense that each is processed by the same underlying model in order to make instance segmentation easy. To encode the grouping we introduce discreet latent variables $g_j \in \{1 \ldots G\}$ which denote the group assignment or each input element $x_j$. We want the model to reason not only about the groups but also about these assignments. This means we need to infer both the group assignments and the identities of the groups.

Iterative Inference. Effectively we need to do inference over two sets of latent variables: the group assignments and the object representations. This formulation is very similar to mixture models for which exact inference is typically intractable. A common approach is to approximate the inference in an iterative manner, by alternating between estimation the two sets (e.g., all EM like methods). The intuition is that given the grouping, inferring the objects becomes easy, and vice versa. So we employ a similar strategy by allowing the model to iteratively refine its estimates. If the model can improve the estimates in each step it will converge to a final solution.

Amortized Inference. Instead of deriving an inference algorithm and running it, we train a parametric mapping to arrive at the end result of inference as efficiently as possible. This is known as amortized inference. It is used for instance in variational autoencoders where the encoder learns to amortize the posterior inference needed by the generative model represented by the decoder. Rather than using variational autoencoders, we apply denoising autoencoders which are trained to reconstruct original inputs x from corrupted versions $\tilde{x}$. It turns out that this encourages the network to implement useful amortized posterior inference without ever having to specify or even know the underlying generative model whose inference is implicitly amortized. The situation is analogous to normal supervised deep learning which can also be seen as amortized inference. Rather than specifying all the hidden variables that are related to the inputs and labels and then deriving an inference algorithm and running it, a supervised deep model is trained to arrive at the an approximation Q(class|input) of the true posterior P(class|input) without the user specifying or typically even knowing the underlying generative model. This works as long as the network is provided with the information and mechanisms needed to implement an efficient approximation of posterior inference.

Figure 6:
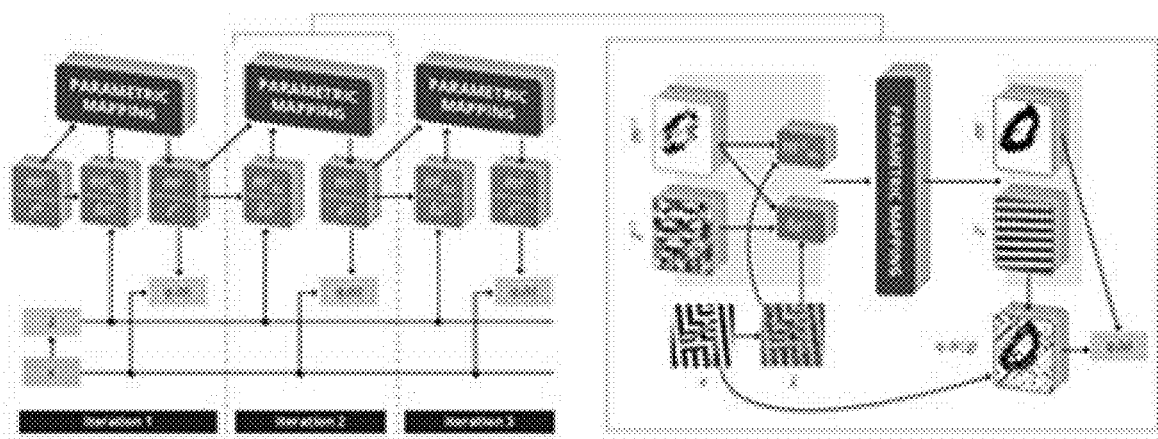
FIG. 6 illustrates schematically an example of a TAG framework.

Putting It All Together. FIG. 6 shows the TAG framework. A high-level overview is that we train an iterative network to denoise corrupted inputs.

Given an input x, we first corrupt it with noise into x which is the only version we show to the network. The final output of the network is an approximation q(x) of the true probability p(x|x̃) which it refined over iterations indexed by i. As the cost function for training the network, we used the negative log likelihood $$C_d(x) = \Sigma_j - \log q(x_j)$$

where the summation is over elements j of the input. Internally, the network maintains G versions of its internal representations which are indexed by $g:z_g$ is the expected value of the input and mg are the group assignment probabilities. Each has the same dimensionality as the input and they are updated over iterations. Each group g makes its own prediction about the original input based on $z_g$. In the binary case we have simply $Q(X_j|g) = z_{g,j}$ and in the continuous case we take $z_{g,j}$ to represent the mean of a Gaussian distribution. Note that it would be easy to add other estimates like the variance of the Gaussian distribution. We assumed the variance to be constant over iterations and groups but learned it from the data. The final prediction of the network is defined to be $$q(x_j) = \Sigma_g m_{g,j} q(x_j|g).$$

The group assignment probabilities are forced to be non-negative and sum up to one over g:

$$m_{g,j} \geq 0 \text{ and } \Sigma_g m_{g,j} = 1$$

The denoising task encourages the network to iteratively group its inputs into coherent groups that can be modeled efficiently. The trained network can be useful for a real-world denoising application but typically the idea is to encourage the network to learn interesting internal representations. So it is not q(x) but $m_s$, $z_s$ and the internal representations of the parametric mapping that we typically care for.

A normal denoising autoencoder would only be provided with the corrupted x as its input but now we also input the previous estimates. Moreover, rather than feeding in the original corrupted x̃, we input quantities which carry information about the remaining modeling errors since this is the type of information that is typically the most useful for iteratively refining an estimate. We just need to keep in mind that in the denoising autoencoder framework, all input to the network has to be derived from the corrupted x̃. So for instance in the continuous case, an obvious choice for $z_{g,j}$ would be $$-\partial C_d(x)/z_{g,j} \propto m_{g,j}(x_j - z_{g,j})$$

but this is not allowed since $C_d$ is a function of x rather than x̃. So instead we use $$\delta z_{g,j} = m_{g,j}(\tilde{x}_j - z_{g,j}).$$

Similarly the bottom-up information mg about the group assignment is computed based on $q(\tilde{x}_j|g)$, a measure of how well each group models each input element. Note that we do not need to know how exactly this information will be used as the network will learn that.

3 THE TAGGER: OUR IMPLEMENTATION OF THE TAG MECHANISM

The final ingredient needed in the TAG framework is the parametric model which does all the heavy lifting of inference. It has a dual task: first, to denoise the estimate $z_s$ of what each group says about the input, and second, to update the group assignment probabilities $m_s$ of each input element. The gradient information is based on corrupted input x so the parametric network has to denoise this and in effect implement posterior inference for the estimated quantities. We chose the Ladder network because its structure reflects the computations needed for posterior inference in hierarchical latent variable models. This means that the network is well equipped to handle the hierarchical structure one might expect to find in many domains. This Ladder network wrapped in the TAG framework we call the Tagger.

Vanilla Tagger. We mostly used the specifications of the Ladder network with only the bottom layer cost function but there are some minor modifications that we need the original output from the network. Other inputs were simply augmented to the input vector fed to the first hidden layer of the encoder. The extra output mg was created by adding a new projection matrix from the last hidden layer of the encoder to softmax functions which enforce the conditions $$\Sigma_g m_{g,j} = 1 \text{ and } m_{g,j} \geq 0.$$

We found the model to become more stable when we added a sigmoid function to the gating variable v used in all the decoder layers with continuous outputs. We further extended the Ladder network to the binary case by putting the last decoder output through a logistic sigmoid function. In compensation, the lateral connection to this output was put through a logit function (inverse of logistic sigmoid). We call this Tagger with minimal modifications to the underlying Ladder network the Vanilla Tagger.

Tagger. Although the Vanilla Tagger performs reasonably well, we found out that we could improve learning speed and grouping quality by making further modifications to the Ladder network: 1) modified lateral connection to $z_g$, 2) sequential rather than parallel update of $z_g$ and $m_g$, 3) competition mechanism and 4) decorrelation cost. These improvements are explained in detail in supplementary material Sec. A.3

4 EXPERIMENTS AND RESULTS

We explore the properties and evaluate the performance of the Tagger both in fully unsupervised settings and in semi-supervised tasks in two datasets:

Shapes. We use the simple shapes dataset to examine the basic properties of our system. It consists of 60K (train)+ 10K (test) binary images of size 20×20. Each image contains three random chosen shapes (Δ, ∇ or •) composed together at random positions with possible overlap.

Textured MNIST. We generated a two-object supervised dataset, txt2MNIST, by sequentially stacking two textured 28×28 MNIST-digits, shifted two pixels left and up, and right and down respectively, on top of a background texture. The textures for the digits and background are different randomly shifted samples from a bank of 20 sinusoidal textures with different frequencies and orientations. We use a 50 k training set, 10 k validation set, and 10 k test set to report the results. The dataset is assumed to be difficult due to the heavy overlap of the objects in addition to the clutter due to the textures. We also use a textured 1-digit version without a shift to isolate the impact of texturing from multiple objects.

We train all models 100 epochs using ADAM.

4.1 Denoising Performance

In order to understand how model size, length of iterative inference, and the number of groups affect the modeling performance, we compare the best of the trained models and evaluate them with two metrics. First, we use the training denoising criterion, the negative log likelihood, and second, consistent with [6], we evaluate the segmentation into objects using the Adjusted Mutual Information (AMI) score and ignore the background and overlap regions in the Shapes dataset.

FIG. 7 (left) demonstrates how the number of groups used for training affects the performance in the Shapes dataset when we vary the number of groups used in test time. Having more than one group in the system improves denoising cost and hence the implicit probabilistic model, but not significantly so anymore by using more than three groups. This is expected, since there are only 3 objects to model in the dataset. If only one group is used in training, the system tries to model the whole data in one group and does not learn to use more groups even if added later. In contrast, if more groups are present in the training, the system becomes robust to the number of test-time groups and performs the best if tested with the same amount of groups as used during training. Note that the AMI score for 2-group testing is low by definition because three whole objects cannot be divided into two groups. FIG. 7 (right) explores the speed of inference over testing iterations which happens in four iterations independent of the model size and variety.

FIG. 7: Analysis of the stability of Tagger on the Shapes dataset. (a) 3 different Taggers are trained with 1, 3 and 5 groups, respectively. The robustness of the models is tested by varying the number of groups (1-6) during test time for each of the models. The plot shows that reaching a good AMI score is insensitive to the number of groups. (b) Iterations are fast to converge. In all models, one iteration is enough to achieve roughly 50% of the AMI. Tagger performs favorably compared to Vanilla Tagger.

We also conducted a similar study for the textured 2-digit MNIST dataset and the results are in line with the findings on the Shapes dataset.

4.2 Unsupervised Perceptual Grouping

FIG. 8A and FIG. 8B show qualitatively the learned unsupervised groupings for Shapes and textured MNIST datasets. Tagger uses its TAG mechanism slightly differently for the two datasets. For Shapes, z represents filled-in objects and masks m show which part of the object is actually visible. For textured MNIST, z the textures and masks m texture segments. In the case of the same digit or two identical shapes, Tagger can segment them into separate groups, and hence does instance segmentation. We used 4 groups for training even though there are only 3 objects in the Shapes dataset and 3 segments in the textured 2-digit MNIST dataset. The unused groups are empty if they are left nothing to represent.

FIGS. 8A and 8B: Qualitative evaluation of groupings for both datasets using Tagger. Left columns above: 7 examples from test set along with their resulting groupings in descending AMI score order. Left columns below: hand-picked examples (A, B, C, D) of special cases. Right columns: 4 groups with corresponding m and z over four ((b) three) iterations with the resulting grouping on top. Example chosen using the median performance example. Color is added for visualization purposes to distinguish different groups. A: Testing of the model with 2 groups. B: Testing of the 3-group model with 4 objects. C: Testing of the 3-group model with two objects. D: Demonstration of long-distance dependency modeling.

Hand-picked, representative, examples A-C illustrates the robustness of the system when the number of objects change in the dataset or when testing is done with less groups. In order to solve the textured 2-digit MNIST task, the system has to combine texture cues with high-level shape information. It first gets the background texture and mask finalized on the first iteration, then typically the second iteration gets hold of the texture used for top-most digit and subsequent iterations clarify the occluded digit and its texture. This demonstrates why iterations are necessary for the grouping. Another evidence to support that the system has the high-level information and not just local cues is visible in hand-picked example D which shows how the system can use long-distance correlations to construct the occluded digit from three disjoint parts, even though it would have a fourth group available to represent them separately.

4.3 Classification

Next we investigate the role of grouping for the task of classification. We evaluate the Tagger against four baseline models on the textured MNIST task. As our first baseline we use a fully connected network (FC) with ReLU activations with batch normalization after each layer. Our second baseline is a ConvNet (Conv) based on Model C from which has close to state of the art results on CIFAR-10. We removed dropout, added batch normalization after each layer and replaced the final pooling by a fully connected layer. Furthermore we compare with a fully connected Ladder (FC Ladder) network and a convolutional Ladder (Conv Ladder Γ). All models use a softmax output and are trained with 50K samples to minimize the categorical cross entropy error. In case there are two different digits in the image (most examples in the txt2MNIST dataset) the target is p=0.5 for both classes. We evaluate the models based on classification errors. For the 2-digit case we score the network based on the two highest predicted classes (top2). For Tagger we add a final encoder pass through the Ladder network with untied weights and an additional softmax layer at the top that includes an added 'no class' neuron. The Tagger can use this class for groups that don't contain any digit without affecting the final classification prediction. The final classification is then done by summing the softmax output over all groups for the true 10 classes, and then renormalizing this sum to add up to one. We train the whole system end-to-end using only denoising for 50 epochs and then slowly ramping up the classification cost for another 50 epochs. The final results are summarized in Table 1.

supervised learning the Ladder is arguably one of the strongest baselines with SOTA results on 1.000 MNIST and 60.000 permutation invariant MNIST classification. We follow the common practice to use 1.000 labeled samples and 49.000 unlabeled samples for training the Tagger and the Ladder baselines. For completeness we also report the result of the Conv and FC baselines trained fully supervised on only 1.000 samples.

From the results in Table 1 it is obvious that all the fully supervised methods fail on this task with only 1.000 labels. The best result is the Conv FF which achieves around 52% error in the single digit case, but performs at chance level for two digit classification. The best baseline result is achieved by the FC Ladder which gets to 29.7% error for one digit but 68.5% for txt2MNIST. For both datasets we can see that the Tagger achieves by far the lowest error rates with 11.1% and 29.7% respectively. Again this difference is amplified for the two digit case where the Tagger with 1.000 labels even outperforms the Ladder baseline with all labels. This matches our intuition that grouping can often segment out objects even of an unknown class and thus help picking up on the relevant features for learning. This is especially important in semi-supervised learning where the inability to self-classify unlabeled samples can easily mean that the network fails to learn from them at all.

TABLE 1

Test-set classification errors for textured 1-digit MNIST (chance level: 90%) and top-2 error on the textured 2-digit MNIST dataset (chance level: 80%). We report mean and sample standard deviation over 5 runs.

| Dataset | Method | Error 50k | Error 1k | Model details |
|---|---|---|---|---|
| txt1MNIST | FC Ladder | 11.2 ± 0.2 | 66.3 ± 1.0 | 1000-500-250-250-250 |
|  | FC Ladder | 7.2 ± 0.1 | 30.5 ± 0.5 | 3000-2000-1000-500-250 |
|  | FC MLP | 31.1 ± 2.2 | 89.0 ± 0.2 | 2000-2000-2000/1000-1000 |
|  | FC Tagger (ours) | 3.2 ± 0.1 | 11.5 ± 0.6 | 1000-500-250-250-250 |
|  | Conv Ladder Γ | 4.6 ± 0.4 | 65.7 ± 2.3 | based on Model Conv-Small Γ [12] |
|  | ConvNet | 3.9 ± 0.3 | 52.4 ± 5.3 | based on Model C [18] |
| txt2MNIST | FC Ladder | 43.9 ± 0.4 | 75.1 ± 0.3 | 1000-500-250-250-250 |
|  | FC Ladder | 41.1 ± 0.2 | 68.5 ± 0.2 | 3000-2000-1000-500-250 |
|  | FC MLP | 55.2 ± 1.0 | 79.4 ± 0.3 | 2000-2000-2000/1000-1000 |
|  | FC Tagger (ours) | 8.2 ± 0.4 | 28.7 ± 0.8 | 1000-500-250-250-250 |
|  | Conv Ladder Γ | 12.9 ± 0.6 | 78.0 ± 0.2 | based on Model Conv-Small Γ [12] |
|  | ConvNet | 12.6 ± 0.4 | 79.1 ± 0.8 | based on Model C [18] |

FC = Fully Connected

We can see that the Tagger performs significantly better than all the baseline models on both variants, but the improvement is more pronounced for the 2 digit case. This is expected, since for cases with multi-object overlap grouping becomes more important. It confirms the hypothesis that grouping can help classification and is especially beneficial for complex inputs. Remarkably the Tagger, despite being fully connected, outperforms the convolutional baseline. We hypothesize that one reason for this is that grouping allows to build efficient invariant features already in the low layers without losing information about the assignment of features to objects. Convolutional networks solve this problem by grouping features by location through the use of receptive fields, but that strategy is expensive and can break down in cases of heavy overlap.

4.4 Semi-Supervised Learning

Training TAG doesn't rely on labels and is therefore directly usable in a semi-supervised context. For semi-

5 RELATED WORK

Attention models have been very popular recently and like perceptual grouping they help deal with complex structured inputs. They are not, however, mutually exclusive and can even benefit from each other. Overt attention models control a window (fovea) to focus on relevant parts of the inputs. They are to the image domain and to objects that are roughly the same shape as the window. But their ability to reduce the problem size by limiting the field of view can help reduce the complexity of the target problem, and thus also help segmentation.

Inspired by what is called covert attention in cognitive science, soft attention mechanisms use some form of top-down feedback to suppress inputs that are irrelevant for a given task. Recently gaining popularity, first in machine translation and then applied to many other problems like image caption generation. All these methods re-weigh the inputs based on their relevance and could benefit from a perceptual grouping process that structures the inputs. With that the attention would only need to decide roughly which objects to attend to and the precise boundaries could be refined by the grouping mechanism.

Our work is mainly built upon a line of research based on the idea that the brain uses synchronization of neuronal firing to bind object representations together. This view was introduced and has inspired a lot of early work on oscillations in neural networks. Simulating the oscillations explicitly is costly and doesn't mesh well with modern neural network architectures. So have used complex values to model oscillating activations using the phase as soft tags for synchronization. In our model we use an even further abstraction that discretizes these. It is most similar to the models of. However our work is the first to combine this with denoising autoencoders in an end-to-end trainable fashion.

Another closely related line of research has focused on multi-causal modeling of the inputs. They model each input as a mixture model with a separate latent variable for each object. Because exact inference is intractable these models approximate this with some form of Expectation Maximization or sampling procedure. While our assumptions are very similar, we let the model to learn the amortized inference directly.

6 CONCLUSION

In this paper we have argued that the ability to group input elements and internal representations is a powerful tool that can improve a system's ability to deal with complex multi-object inputs. We've introduced the TAG framework which enables a network to directly learn the grouping and the corresponding amortized iterative inference in a unsupervised manner. The resulting iterative inference is very efficient and converges within 5 iterations. We demonstrated the benefits of this mechanism for a heavily cluttered classification task where our fully connected Tagger even significantly outperformed a state of the art convolutional network. More impressively we have shown that our mechanism can greatly improve semi-supervised learning, beating conventional Ladder networks by a big margin. Our method takes minimal assumptions about the data and can be applied to any modality. With TAG we have barely scratched the surface of a comprehensive integrated grouping mechanism, but already we see significant advantages. We believe grouping to be crucial to human perception and are convinced that it will in the future help to scale neural networks to even more complex tasks.

A Supplementary Material for the Paper "Tagger: Deep Unsupervised Perceptual Grouping"

A.1 Notation x input x̃ corrupted input p(x|x̃) posterior of the data given the corrupted data q(x) learnt approximation of p(x|x̃)

$z_g$ The predicted mean of input for each group g. Has the same dimensions as the input.

$q(x_j|g)$ The probability which group g assigns to the input.

$m_g$ Probabilities for the group assignment. Has the same dimensions as the input.

i iteration index j input element index g group index

A.2 Derivation of ∂z in the Binary Case

As explained in Sec. 2, ∂z carries information about the remaining prediction error. Since we are only allowed to input information about the corrupted x̃ but not the original clean x, we cannot use the derivative $-\partial C/\partial z_{g,j}$. Rather, we define $$\tilde{C} = \sum_j -\log\left(\sum_g P(\tilde{x}_j \mid z_{g,j})m_{g,j}\right).$$

and use $-\partial \tilde{C}/\partial z_{g,j}$. In the continuous case we model the input as a Gaussian variable with mean z so it makes sense to simply use $$\delta z_{g,j} = m_{g,j}(\tilde{x}_j - z_{g,j}) \propto -\partial \tilde{C}_d(x)/z_{g,j}.$$

Note that since the network will multiply its inputs with weights, we can always omit any constant multipliers.

In the following, we will drop the index j, the input element index, because we can work on each input element separately. Let us denote the corruption bit-flip probability by β and define $$\xi_g := E_{P(x|z_g)}\{x\} = (1-2\beta)z_g + \beta$$

We then have $$P(\tilde{x} \mid z_g) = \tilde{x}\xi_g + (1-\tilde{x})(1-\xi_g)$$

$$\frac{\partial \tilde{C}}{\partial z_g} = -\frac{1}{\sum_{g'} P(\tilde{x} \mid z_{g'})m_{g'}} \frac{\partial P(\tilde{x} \mid z_g)m_g}{\partial z_g}$$

$$= -\frac{(\tilde{x}(1-2\beta) - (1-\tilde{x})(1-2\beta))m_g}{\sum_{g'} P(\tilde{x} \mid z_{g'})m_{g'}}$$

$$= -\frac{(\tilde{x}(1-2\beta) - (1-\tilde{x})(1-2\beta))m_g}{\sum_{g'} (\tilde{x}\xi_g + (1-\tilde{x})(1-\xi_g))s_{g'}}$$

which simplifies for x̃=1 as $$= -\frac{(1-2\beta)m_g}{\sum_{g'} \xi_g m_{g'}} \approx -\frac{m_g}{\sum_{g'} \xi_g m_{g'}}$$

and for x̃=0 as $$= \frac{(1-2\beta)m_g}{1-\sum_{g'} \xi_g m_{g'}} \approx \frac{m_g}{1-\sum_{g'} \xi_g m_{g'}} = -\frac{m_g}{\sum_{g'} \xi_g m_{g'} - 1}.$$

Putting it back together:

$$\frac{\partial \tilde{C}}{\partial z_g} = -\frac{m_g}{\sum_{g'} \xi_g m_{g'} - 1 + \tilde{x}}$$

A.3 Model Improvements Between Vanilla Tagger and Tagger

Here we list the modifications to the Ladder Network that improved the performance of the Vanilla Tagger and led to Tagger. A simple finding was that in the continuous case, instead of inputting $z_g$ to the lateral connection, $z_g + \partial z_g$ results in faster training, likely because it is a better default value for the next estimate of $z_g$.

Another modification is motivated by noting that $z_g$ and $m_g$ are highly interlinked which makes it difficult to update them both at the same time without risking a conflict. To make it easy to keep both variables coherent, we 1) first update just $z_g$, 2) then compute $m_{Bu}$ based on x and the updated $z_g$, and 3) augment the last hidden layer with the freshly computed $m_{BU}$ before computing the new estimate $m_g$.

The final modifications make it easier for the Ladder network to prune out representations which likely belong to a different group. Assuming sparse coding for internal representations, it is likely that a hidden unit activation is leaking from a different group if that group has a much stronger activation for the corresponding hidden unit. Optimal inference therefore often looks like competition between explanations, a phenomenon known as explaining away. Although the softmax implements competition for group assignments, there is no mechanism for implementing competition between values $z_g$ of different groups g or between hidden layer activations so we added such a mechanism. We applied it to the decoder rather than the encoder because the decoder has more time to integrate all the information necessary for deciding how much support there is for each feature activation in different groups.

The competition mechanism was implemented as follows. For each batch-normalized hidden unit activation $h_{j,g}$ we computed the winning coefficient $$\alpha_{j,g} = h_{j,g}^2 / (10^{-6} + \Sigma_g h_{j,g}^2)$$

which is a quantity between 0 and 1. In order to let the network learn whether competition is useful or not, we interpolate between $\alpha_{j,g}$ and 1 with a trainable gating variable before multiplying $h_{j,g}$ with the winning coefficient.

It turned out that the network benefited from this competition mechanism and took it in use but more reliably when we also added a small decorrelation cost to $z_g$ which encourages the values to be uncorrelated over g.

Future Work

Important future extensions include temporal models and hierarchy of local groupings. We believe this should make it possible to scale the approach to video.

Essentially we have assumed the groups to represent independent objects or events. That's unrealistic in many cases but conditional independence is much more reasonable. It can be implemented by allowing all groups to share top-layers of their Ladder network.

Also, we assumed that each input element is generated by just one object. Often this is more realistic if we operate on the result of a sparse expansion rather than raw inputs.

This model has just one level of groupings but a hierarchical model of the world is needed. Our model can be used as a component in a hierarchical one. The module starts with an expand layer and ends with a collapse layer. The groups then represent conditionally independent sparsely coded objects.

We hypothesize that a hierarchical Tagger can represent relations because relations are simply the couplings left over from the assumption of independent objects.

Movement is a strong segmentation cue and temporal extensions should be simple: simply connect higher layers forward in time, not just the expand layer. Iteration would then happen in time with input changing.

Some aspects of the present invention may relate to a computer program product stored in the memory of the processing unit wherein the computer program product comprises computer-executable instructions that cause, when executed by at least one processor, the processing unit to implement the method as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A non-transitory computer-readable medium on which is stored a computer program which, when executed by a computer, performs a method for segmenting input data comprising:
    generating tags for at least one data element in the input data;
    masking the input data with the tags to generate masked input data, wherein the masked input data includes multiple portions of the input data that are segmented according to the tags;
    generating output reconstructions by inputting the masked input data to a neural network;
    determining values representing distances of each of the output reconstructions to the input data;
    generating updated versions of input data by applying at least one of the values representing distances of each of the output reconstructions to the input data; and
    generating updated output reconstructions by inputting the updated versions of input data to the neural network.

2. The non-transitory computer-readable medium of claim 1, wherein generating the updated versions of input data comprises:
    determining a minimum distance among the values representing the distances of each of the output reconstructions to the input data and a respective one of the tags that generated the minimum distance;
    updating the generated tags by replacing the tags with the tag that generated the minimum distance; and
    obtaining data elements of the input data corresponding to original tags from input data and other data elements from the output reconstruction data generated with the tag that generated the minimum distance for generating new input data.

3. The non-transitory computer-readable medium of claim 1, wherein the method further comprises:
    obtaining the values representing distances of each of the output reconstructions to the input data and providing them to the neural network for generating updated tags.

4. The non-transitory computer-readable medium of claim 1, wherein the method further comprises:
    obtaining the values representing distances of each of the output reconstructions to the input data and providing them to the neural network for generating updated tags;
    determining a minimum distance among the values representing the distances of each of the output reconstructions to input data and the tag that generated the minimum distance; and
    obtaining data elements of the input data corresponding to original tags from input data and other data elements from the output reconstruction data generated with the tag that generated the minimum distance for generating new input data.

5. The non-transitory computer-readable medium of claim 1, wherein generating updated versions of input data comprises generating updated tags based on the values representing distances of each of the output reconstructions to the input data.

6. The non-transitory computer-readable medium of claim 1, wherein the at least one data element includes at least one of a pixel or a group of pixels.

7. The non-transitory computer-readable medium of claim 1, wherein the neural network is at least one of a denoising neural network or a variational autoencoder.

8. A method for segmenting input data, comprising:
generating tags for at least one data element in the input data, wherein the tags represent a segmentation of the input data;
masking the input data with the tags to generate masked input data, wherein the masked input data includes multiple portions of the input data that are segmented according to the tags;
generating output reconstructions by inputting the masked input data to a neural network;
determining values representing distances of each of the output reconstructions to the input data;
generating updated versions of input data by applying at least one of the values representing distances of each of the output reconstructions to the input data; and
generating updated output reconstructions by inputting the updated versions of input data to the neural network.

9. The method of claim 8, wherein generating the updated versions of input data comprises:
determining a minimum distance among the values representing the distances of each of the output reconstructions to the input data and a respective one of the tags that generated the minimum distance;
updating the generated tags by replacing the tags with the tag that generated the minimum distance; and
obtaining data elements of the input data corresponding to original tags from input data and other data elements from the output reconstruction data generated with the tag that generated the minimum distance for generating new input data.

10. The method of claim 8, wherein the method further comprises:
obtaining the values representing distances of each of the output reconstructions to the input data and providing them to the neural network for generating updated tags.

11. The method of claim 8, wherein the method further comprises:
obtaining the values representing distances of each of the output reconstructions to the input data and providing them to the neural network for generating updated tags;
determining a minimum distance among the values representing the distances of each of the output reconstructions to input data and the tag that generated the minimum distance; and
obtaining data elements of the input data corresponding to original tags from input data and other data elements from the output reconstruction data generated with the tag that generated the minimum distance for generating new input data.

12. The method of claim 8, wherein generating updated versions of input data comprises generating updated tags based on the values representing distances of each of the output reconstructions to the input data.

13. The method of claim 8, wherein the at least one data element includes at least one of a pixel or a group of pixels.

14. The method of claim 8, wherein the neural network is at least one of a denoising neural network or a variational autoencoder.

15. A system for segmenting input data, comprising:
a memory; and
a processor that is operable to execute instructions that are stored in the memory, wherein the instructions, when executed by the processor, cause the processor to:
generate tags for at least one data element in the input data, wherein the tags represent a segmentation of the input data;
mask the input data with the tags to generate masked input data, wherein the masked input data includes multiple portions of the input data that are segmented according to the tags;
generate output reconstructions by inputting the masked input data to a neural network;
determine values representing distances of each of the output reconstructions to the input data;
generate updated versions of input data by applying at least one of the values representing distances of each of the output reconstructions to the input data; and
generate updated output reconstructions by inputting the updated versions of input data to the neural network.

16. The system of claim 15, wherein the instructions to generate the updated versions of input data further cause the processor to:
determine a minimum distance among the values representing the distances of each of the output reconstructions to the input data and a respective one of the tags that generated the minimum distance;
update the generated tags by replacing the tags with the tag that generated the minimum distance; and
obtain data elements of the input data corresponding to original tags from input data and other data elements from the output reconstruction data generated with the tag that generated the minimum distance for generating new input data.

17. The system of claim 15, wherein the instructions further cause the processor to:
obtain the values representing distances of each of the output reconstructions to the input data and provide them to the neural network for generating updated tags.

18. The system of claim 15, wherein the instructions further cause the processor to:
obtain the values representing distances of each of the output reconstructions to the input data and provide them to the neural network for generating updated tags;
determine a minimum distance among the values representing the distances of each of the output reconstructions to input data and the tag that generated the minimum distance; and
obtain data elements of the input data corresponding to original tags from input data and other data elements from the output reconstruction data generated with the tag that generated the minimum distance for generating new input data.

19. The system of claim 15, wherein generating updated versions of input data comprises generating updated tags based on the values representing distances of each of the output reconstructions to the input data.

20. The system of claim 15, wherein the at least one data element includes at least one of a pixel or a group of pixels.

21. The system of claim 15, wherein the neural network is at least one of a denoising neural network or a variational autoencoder.

\* \* \* \* \*